(12) United States Patent
Qi

(10) Patent No.: US 12,149,478 B2
(45) Date of Patent: Nov. 19, 2024

(54) POSITIONING REFERENCE SIGNAL CONFIGURATION IN A TELECOMMUNICATION SYSTEM

(71) Applicant: Samsung Electronics Co., Ltd., Suwon-si (KR)

(72) Inventor: Yinan Qi, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/437,187

(22) Filed: Feb. 8, 2024

(65) Prior Publication Data

US 2024/0178972 A1 May 30, 2024

Related U.S. Application Data

(63) Continuation of application No. 17/250,459, filed as application No. PCT/KR2019/009333 on Jul. 26, 2019, now Pat. No. 11,902,206.

(30) Foreign Application Priority Data

Jul. 27, 2018 (GB) ...................................... 1812286
Aug. 3, 2018 (GB) ...................................... 1812705

(51) Int. Cl.
*H04L 5/00* (2006.01)
*H04W 72/0446* (2023.01)

(52) U.S. Cl.
CPC ....... *H04L 5/0053* (2013.01); *H04W 72/0446* (2013.01)

(58) Field of Classification Search
CPC ..... H04L 5/0035; H04L 5/0048; H04L 5/005; H04L 5/0053; H04L 5/0094; H04W 72/0446; H04W 72/231; H04W 64/00
See application file for complete search history.

(56) References Cited

U.S. PATENT DOCUMENTS 10,218,471 B1 2/2019 Kumar et al.
2010/0195566 A1 8/2010 Krishnamurthy et al.
(Continued)

FOREIGN PATENT DOCUMENTS

CN 108282319 A * 7/2018 ............... H04L 5/00
CN 108391311 B * 11/2020 ......... H04L 27/2601
(Continued)

OTHER PUBLICATIONS

International Search Report and Written Opinion of the International Searching Authority in connection with International Application No. PCT/KR2019/009333 dated Nov. 8, 2019, 10 pages.

(Continued)

*Primary Examiner* — Chi H Pham
*Assistant Examiner* — Vladislav Y Agureyev

(57) ABSTRACT

The present disclosure relates to a communication method and system for converging a $5^{th}$ Generation (5G) communication system for supporting higher data rates beyond a $4^{th}$-Generation (4G) system with a technology for Internet of Things (IOT). The present disclosure may be applied to intelligent services based on the 5G communication technology and the IoT-related technology, such as smart home, smart building, smart city, smart car, connected car, health care, digital education, smart retail, security and safety services. Disclosed is a method of configuring a positioning reference signal in a telecommunication system, comprising the step of distributing a plurality of positioning reference signal on a per-slot, per-mini slot or per-subframe basis. Also disclosed is a method of using a User Equipment, UE, in a telecommunications network, comprising the steps of configuring the simultaneous use of TD-OCC DMRS and PTRS in at least one of uplink and downlink.

20 Claims, 25 Drawing Sheets

(56) References Cited

U.S. PATENT DOCUMENTS

| | | |
|---|---|---|
| 2010/0322184 A1 | 12/2010 | Xiao |
| 2012/0040696 A1 | 2/2012 | Siomina et al. |
| 2012/0165053 A1 | 6/2012 | Yoon et al. |
| 2013/0308567 A1 | 11/2013 | Chen et al. |
| 2013/0315168 A1* | 11/2013 | Frank .................... G01S 5/0205 370/329 |
| 2014/0171097 A1* | 6/2014 | Fischer ................ H04W 16/32 455/456.1 |
| 2015/0270936 A1* | 9/2015 | Han ..................... H04L 5/0035 370/329 |
| 2015/0358986 A1 | 12/2015 | Yang et al. |
| 2016/0065342 A1 | 3/2016 | Mirbagheri et al. |
| 2017/0339658 A1 | 11/2017 | Wang et al. |
| 2018/0048444 A1 | 2/2018 | Park et al. |
| 2018/0054792 A1* | 2/2018 | Lee ........................ H04B 17/24 |
| 2018/0097596 A1 | 4/2018 | Palanivelu et al. |
| 2018/0098187 A1 | 4/2018 | Blankenship et al. |
| 2018/0124787 A1* | 5/2018 | Wang .................... G01S 5/0236 |
| 2018/0217228 A1 | 8/2018 | Edge et al. |
| 2018/0270784 A1* | 9/2018 | Lee ...................... H04W 24/10 |
| 2018/0331804 A1 | 11/2018 | Hessler et al. |
| 2019/0007923 A1* | 1/2019 | Blankenship ......... H04L 5/0073 |
| 2019/0020461 A1 | 1/2019 | Yerramalli et al. |
| 2019/0037525 A1 | 1/2019 | Liu et al. |
| 2019/0037529 A1* | 1/2019 | Edge .................... G01S 1/0428 |
| 2019/0074946 A1* | 3/2019 | Xue ...................... H04L 5/0082 |
| 2019/0174454 A1* | 6/2019 | Priyanto .............. G01S 5/0036 |
| 2019/0174466 A1 | 6/2019 | Zhang et al. |
| 2019/0245663 A1* | 8/2019 | Kim ..................... H04L 5/0048 |
| 2019/0261368 A1 | 8/2019 | Opshaug et al. |
| 2019/0319827 A1 | 10/2019 | Opshaug et al. |
| 2019/0372617 A1 | 12/2019 | Chen et al. |
| 2019/0380107 A1* | 12/2019 | Yoon .................. H04W 64/003 |
| 2019/0394634 A1 | 12/2019 | Akkarakaran et al. |
| 2020/0382263 A1* | 12/2020 | Xu ........................ H04L 5/0007 |
| 2021/0120519 A1* | 4/2021 | Si ........................ H04W 64/003 |
| 2021/0160810 A1* | 5/2021 | Zhang ..................... G01S 5/10 |
| 2021/0242994 A1* | 8/2021 | Bi ......................... H04L 5/0048 |
| 2024/0267875 A1* | 8/2024 | Zhou .................... H04L 5/0053 |

FOREIGN PATENT DOCUMENTS

| | | |
|---|---|---|
| EP | 2477349 A2 | 7/2012 |
| EP | 3276851 A1 | 1/2018 |
| EP | 3282632 A1 | 2/2018 |
| EP | 3497465 B1 | 11/2021 |
| WO | 2016163943 A1 | 10/2016 |
| WO | 2017138871 A1 | 8/2017 |
| WO | 2017200708 A1 | 11/2017 |
| WO | 2017206437 A1 | 12/2017 |
| WO | 2018030682 A1 | 2/2018 |
| WO | 2018058590 A1 | 4/2018 |
| WO | 2019045141 A1 | 3/2019 |
| WO | 2019196666 A1 | 10/2019 |
| WO | 2020015499 A1 | 1/2020 |

OTHER PUBLICATIONS

Ericsson, "Feature lead summary 1 of PT-RS," R1-1803245, 3GPP TSG RAN WG1, Meeting #92, Athens, Greece, Feb. 26-30, 2018, 17 pages.

Ericsson, "Feature lead summary 1 of PT-RS," R1-1807658, 3GPP TSG RAN WG1 Meeting #93, Busan, Korea, May 21-25, 2018, 17 pages.

Intel Corporation, "Remaining Issues on PT-RS," R1-1802402, 3GPP TSG RAN WG1, Meeting #92, Athens, Greece, Feb. 26-Mar. 2, 2018, 11 pages.

3GPP TR 38.913 V14.3.0 (Jun. 2017), Technical Report, 3rd Generation Partnership Project; Technical Specification Group Radio Access Network; Study on Scenarios and Requirements for Next Generation Access Technologies; (Release 14), Jun. 2017, 39 pages.

3GPP TS 22.261 V16.4.0 (Jun. 2018), Technical Specification, 3rd Generation Partnership Project; Technical Specification Group Services and System Aspects; Service requirements for the 5G system; Stage 1 (Release 16), Jun. 2018, 55 pages.

3GPP TR 22.872 V0.0.0 (Aug. 2017), Technical Report, 3rd Generation Partnership Project; Technical Specification Group Services and System Aspects; Study on positioning use cases; Stage 1 (Release 15), Aug. 2017, 12 pages.

3GPP TR 22.804 V0.3.0 (Nov. 2017), Technical Report, 3rd Generation Partnership Project; Technical Specification Group Services and System Aspects; Study on Communication for Automation in Vertical Domains; (Release 16), Nov. 2017, 137 pages.

Combined Search and Examination Report dated Nov. 30, 2018 in connection with United Kingdom Application No. GB1812286.1, 5 pages.

Combined Search and Examination Report dated Feb. 4, 2019 in connection with United Kingdom Application No. GB1812705.0, 2 pages.

Examination Report dated Nov. 20, 2020 in connection with United Kingdom Application No. 1812286.1, 2 pages.

Examination Report dated Dec. 4, 2020 in connection with United Kingdom Application No. 1812705.0, 2 pages.

Combined Search and Examination Report dated Jun. 7, 2021, in connection with United Kingdom Application No. GB2106336.7, 6 pages.

Examination Report dated Jan. 7, 2022, in connection with United Kingdom Application No. GB2106336.7, 3 pages.

\* cited by examiner

FIG. 16

| Scheduled MCS | Time density [$L_{PT-RS}$] |
|---|---|
| $I_{MCS}$ < ptrs-MCS$_1$ | PT-RS is not present |
| ptrs-MCS1 ≤ $I_{MCS}$ < ptrs-MCS2 | 4 |
| ptrs-MCS2 ≤ $I_{MCS}$ < ptrs-MCS3 | 2 |
| ptrs-MCS3 ≤ $I_{MCS}$ < ptrs-MCS4 | 1 |

FIG. 17

| DM-RS antenna port $\tilde{p}$ | $k^{RE}_{ref}$ | | | | | | | |
|---|---|---|---|---|---|---|---|---|
| | DM-RS Configuration type 1 | | | | DM-RS Configuration type 2 | | | |
| | resourceElementOffset | | | | resourceElementOffset | | | |
| | 00 | 01 | 10 | 11 | 00 | 01 | 10 | 11 |
| 0 | 0 | 2 | 6 | 8 | 0 | 1 | 6 | 7 |
| 1 | 2 | 4 | 8 | 10 | 1 | 6 | 7 | 0 |
| 2 | 1 | 3 | 7 | 9 | 2 | 3 | 8 | 9 |
| 3 | 3 | 5 | 9 | 11 | 3 | 8 | 9 | 2 |
| 4 | - | - | - | - | 4 | 5 | 10 | 11 |
| 5 | - | - | - | - | 5 | 10 | 11 | 4 |

FIG. 18

| DM-RS antenna port $\tilde{p}$ | $k^{RE}_{ref}$ ||||||||
|---|---|---|---|---|---|---|---|---|
| | DM-RS Configuration type 1 |||| DM-RS Configuration type 2 ||||
| | resourceElementOffset |||| resourceElementOffset ||||
| | 00 | 01 | 10 | 11 | 00 | 01 | 10 | 11 |
| 0 | 0 | 2 | 6 | 8 | 0 | 1 | 6 | 7 |
| 1 | 2 | 4 | 8 | 10 | 1 | 6 | 7 | 0 |
| 2 | 1 | 3 | 7 | 9 | 2 | 3 | 8 | 9 |
| 3 | 3 | 5 | 9 | 11 | 3 | 8 | 9 | 2 |
| 4 | 4 | 6 | 10 | 0 | 4 | 5 | 10 | 11 |
| 5 | 6 | 8 | 0 | 2 | 5 | 10 | 11 | 4 |
| 6 | 5 | 7 | 11 | 1 | 6 | 7 | 0 | 1 |
| 7 | 7 | 9 | 1 | 3 | 7 | 0 | 1 | 6 |
| 8 | - | - | - | - | 8 | 9 | 2 | 3 |
| 9 | - | - | - | - | 9 | 2 | 3 | 8 |
| 10 | - | - | - | - | 10 | 11 | 4 | 5 |
| 11 | - | - | - | - | 11 | 4 | 5 | 10 |

FIG. 19

| epre-Ratio | The number of PDSCH layers | | | | | |
|---|---|---|---|---|---|---|
| | 1 | 2 | 3 | 4 | 5 | 6 |
| 0 | 0 | 3 | 4.77 | 6 | 7 | 7.78 |
| 1 | 0 | 0 | 0 | 0 | 0 | 0 |
| 2 | reserved | | | | | |
| 3 | reserved | | | | | |

FIG. 20

| epre-Ratio | The number of PDSCH layers | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 0 | 0 | 3 | 4.77 | 6 | 7 | 7.78 | 8.45 | 9.03 | 9.54 | 10 | 10.41 | 10.79 |
| 1 | 0 | 0 | 0 | 0 | 0 | 0 | 0 | 0 | 0 | 0 | 0 | 0 |
| 2 | reserved | | | | | | | | | | | |
| 3 | reserved | | | | | | | | | | | |

FIG. 21

| epre-Ratio | The number of PDSCH layers | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 0 | 0 | 3 | 4.77 | 6 | 6 | 6 | 6 | 6 | 6 | 6 | 6 | 6 |
| 1 | 0 | 0 | 0 | 0 | 0 | 0 | 0 | 0 | 0 | 0 | 0 | 0 |
| 2 | reserved | | | | | | | | | | | |
| 3 | reserved | | | | | | | | | | | |

FIG. 22

| epre-Ratio | The number of PDSCH layers | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 0 | 0 | 3 | 4.77 | 6 | 7 | 7.78 | 8.45 | 9.03 | 9.54 | 10 | 10.41 | 10.79 |
| 1 | 0 | 0 | 0 | 0 | 0 | 0 | 0 | 0 | 0 | 0 | 0 | 0 |
| 2 | 0 | 3 | 4.77 | | | | | 6 | | | | |
| 3 | | | | | | reserved | | | | | | |

FIG. 23

| UL-PTRS-power/ $\alpha_{PTRS}^{PUSCH}$ | The number of PUSCH layers ($n_{layer}^{PUSCH}$) | | | | | | |
|---|---|---|---|---|---|---|---|
| | 1 | 2 | | 3 | | 4 | | |
| | All cases | Full coherent | Partial and non-coherent and non-codebook based | Full coherent | Partial and non-coherent and non-codebook based | Full coherent | Partial coherent | Non-coherent and non-codebook based |
| 00 | 0 | 3 | 3 Qp-3 | 4.77 | 3 Qp-3 | 6 | 3 Qp | 3 Qp-3 |
| 01 | 0 | 3 | 3 | 4.77 | 4.77 | 6 | 6 | 6 |
| 10 | reserved | | | | | | | |
| 11 | reserved | | | | | | | |

FIG. 24

| Value | DMRS port |
|---|---|
| 0 | 0 |
| 1 | 1 |
| 2 | 2 |
| 3 | 3 |
| 4 | 4 |
| 5 | 5 |
| 6 | 6 |
| 7 | 7 |

POSITIONING REFERENCE SIGNAL CONFIGURATION IN A TELECOMMUNICATION SYSTEM

CROSS-REFERENCE TO RELATED APPLICATIONS

This application is a continuation of application Ser. No. 17/250,459, now U.S. Pat. No. 11,902,206, which is the 371 National Stage of International Application No. PCT/KR2019/009333, filed Jul. 26, 2019, which claims priority to United Kingdom Patent Application No. 1812286.1, filed Jul. 27, 2018, and United Kingdom Patent Application No. 1812705.0, filed Aug. 3, 2018, the disclosures of which are herein incorporated by reference in their entirety.

BACKGROUND

1. Field

The present invention relates to improvements in Location based Services (LBS) used in mobile telecommunication networks to provide location information of a particular User Equipment (UE).

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IOT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In line with this, there is a need to provide an improved configuration to enable the use of positioning technologies.

SUMMARY

Demand for mobile services is expanding quickly and one of the fastest growing segments is Location Based Services (LBS), primarily driven by two major requirements: emergency services and commercial applications. Emergency services desire to know the location of a UE in the event of, for instance, a vehicular accident. Commercial applications desire to know the location of a UE so that the user can be presented with relevant information or advertisements such as, for instance, restaurant deals in his vicinity.

In response to these needs, second and third generation networks (WCDMA, GSM, CDMA) have added support for several positioning technologies, which vary in their accuracy and Time to First Fix (TTFF) performance. 3GPP Release 9 for LTE defines support for positioning technologies: Extended Cell ID (ECID), Assisted Global Navigation Satellite System (A-GNSS), Observed Time Difference Of Arrival (OTDOA) and LTE Positioning Protocol (LPP), a new positioning protocol. A new reference signal, i.e., positioning reference signal (PRS) has been defined in LTE.

Further in Release 11, Uplink Observed Time Different of Arrival (UOTDA) has been adopted using SRS measurement. 3GPP Release 15 defines support for some Radio Access Technology (RAT)-independent positioning techniques, such as Real Time Kinematic (RTK) GNSS, to improve the accuracy of LTE positioning.

There is a need to provide an improved configuration to enable the use of positioning technologies, so as to address shortcomings in the prior art location services. Embodiments of the present invention aim to address these shortcomings.

Embodiments of the present invention are related to improvements in the configuration of User Equipments (UEs) in mobile telecommunication systems. In particular, embodiments of the present invention relate to UEs used in Fifth Generation (5G) or New Radio (NR) systems.

In NR, when two adjacent Orthogonal Frequency Division Multiplexing (OFDM) symbols are allocated for Demodulation Reference Signal (DMRS) transmission, Time-Division Orthogonal Cover Code (TD-OCC) can be used to allocate multiple DMRS ports to the same time-frequency resources. For high frequency bands, where phase rotation may be experienced between two consecutive OFDM symbols, this can lead to channel estimation error among different OFDM symbols.

When PT-RS is configured, it implies that phase rotation between consecutive symbols is significant so that the phase rotation for each symbol has to be estimated and compensated. In such a case, TD-OCC DMRS should not be used because of the significant phase rotation. Without TD-OCC DMRS, the maximum number of transmission layers is limited to half of the actual maximum values (8 for configuration type 1, and 12 for configuration type 2) and the potential peak throughput is also halved.

The prior art agreements capture all cases with PT-RS time density of every symbol, every other symbol and every 4 symbols. However, if the PT-RS time density is every other symbol or even every 4 symbols, the phase rotation between two consecutive symbols might not be so bad that TD-OCC DMRS cannot be used.

Embodiments of the present invention aim to address this problem, as well as other problems not described herein.

According to the present invention there is provided an apparatus and method as set forth in the appended claims. Other features of the invention will be apparent from the dependent claims, and the description which follows.

According to a first aspect of the present invention, there is provided a method of configuring a positioning reference signal in a telecommunication system, comprising the step of distributing a plurality of positioning reference signal on a per-slot, per-mini slot or per-subframe basis.

In an embodiment, the plurality of positioning reference signals are distributed across a plurality of aggregated mini slots.

In an embodiment, the plurality of positioning reference signals are distributed across a subframe comprising two slots.

In an embodiment, a location index of positioning reference signal resource elements follows a pseudo-random sequence.

In an embodiment, the positioning reference signals are distributed so as to avoid collision with a CORESET or PDCCH.

In an embodiment, the positioning reference signals are distributed such that if there is a collision with a CORESET or PDCCH, one or more positioning reference signals are punctured or shifted.

In an embodiment, there is further provided the step of co-ordinating positioning reference signals arriving at a given User Equipment from different cells.

In an embodiment, each cell allocated resources for the positioning reference signal based on measurement results.

In an embodiment, each cell allocates positioning reference signals to resource blocks which do not mutually overlap.

In an embodiment, resource blocks other than positioning reference signals are blanked so to maximise the hearability of the positioning reference signals.

In an embodiment, common resources are allocated for positioning reference signals.

In an embodiment, extended Cyclic Prefix, CP, is utilised for 15 KHz and 30 KHz subcarrier spacing for positioning reference signal.

In an embodiment, positioning reference signals are configured around a DC tone, based upon either Component Carrier, CC, centre or per Bandwidth Part, BWP.

In an embodiment, there is further provided the step of configuring multiple antenna ports for positioning reference signal transmission.

According to a second aspect of the present invention, there is provided a method of using a User Equipment, UE, in a telecommunications network, comprising the steps of configuring the simultaneous use of TD-OCC DMRS and PTRS in at least one of uplink and downlink.

In an embodiment, the simultaneous use of TD-CC DMRS and PTRS is configured in both uplink and downlink.

In an embodiment, the telecommunication network utilises New Radio, NR.

In an embodiment, the simultaneous configuration of TD-OCC DMRS and PTRS is performed on the basis of explicit signalling from a base station or implicitly with reference to Modulation Coding Scheme, MCS, level.

In an embodiment, the UE provides a capability report to the network to indicate if it can support simultaneous configuration of TD-OCC DMRS and PTRS.

In an embodiment, the UE indicates to the network a maximum number of transmission layers it can support and if this number is smaller than or equal to 4 in DMRS type 1, or equal to 6 in DMRS type 2, then there is no simultaneous configuration of TD-OCC DMRS and PTRS; otherwise, simultaneous configuration of TD-OCC DMRS and PTRS is permitted.

In an embodiment, RE offset of PTRS is defined according to the following table:

|  | $k_{ref}^{RE}$ | | | | | | | |
|---|---|---|---|---|---|---|---|---|
| DM-RS antenna port $\tilde{p}$ | DM-RS Configuration type 1 resourceElementOffset | | | | DM-RS Configuration type 2 resourceElementOffset | | | |
|  | 00 | 01 | 10 | 11 | 00 | 01 | 10 | 11 |
| 0 | 0 | 2 | 6 | 8 | 0 | 1 | 6 | 7 |
| 1 | 2 | 4 | 8 | 10 | 1 | 6 | 7 | 0 |
| 2 | 1 | 3 | 7 | 9 | 2 | 3 | 8 | 9 |
| 3 | 3 | 5 | 9 | 11 | 3 | 8 | 9 | 2 |
| 4 | 4 | 6 | 10 | 0 | 4 | 5 | 10 | 11 |
| 5 | 6 | 8 | 0 | 2 | 5 | 10 | 11 | 4 |
| 6 | 5 | 7 | 11 | 1 | 6 | 7 | 0 | 1 |
| 7 | 7 | 9 | 1 | 3 | 7 | 0 | 1 | 6 |
| 8 | — | — | — | — | 8 | 9 | 2 | 3 |
| 9 | — | — | — | — | 9 | 2 | 3 | 8 |
| 10 | — | — | — | — | 10 | 11 | 4 | 5 |
| 11 | — | — | — | — | 11 | 4 | 5 | 10 |

In an embodiment, PTRS is power boosted according to the following table:

| epre-Ratio | The number of PDSCH layers | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| 0 | 0 | 3 | 4 77 | 6 | 7 | 7 78 | 8 45 | 9 03 | 9 54 | 10 | 10 41 | 10 79 |
| 1 | 0 | 0 | 0 | 0 | 0 | 0 | 0 | 0 | 0 | 0 | 0 | 0 |
| 2 |  |  |  |  |  | reserved | | | | | | |
| 3 |  |  |  |  |  | reserved | | | | | | |

In an embodiment, the power boosting of PTRS is capped according to the following table:

| epre-Ratio | The number of PDSCH layers | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 0 | 0 | 3 | 4 77 | 6 | 6 | 6 | 6 | 6 | 6 | 6 | 6 | 6 |
| 1 | 0 | 0 | 0 | 0 | 0 | 0 | 0 | 0 | 0 | 0 | 0 | 0 |
| 2 | | | | | reserved | | | | | | | |
| 3 | | | | | reserved | | | | | | | |

In an embodiment, the power boosting of PTRS is capped according to the following table:

| epre-Ratio | The number of PDSCH layers | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| 0 | 0 | 3 | 4 77 | 6 | 7 | 7 78 | 8 45 | 9 03 | 9 54 | 10 | 10 41 | 10 79 |
| 1 | 0 | 0 | 0 | 0 | 0 | 0 | 0 | 0 | 0 | 0 | 0 | 0 |
| 2 | 0 | 3 | 4 77 | | | | 6 | | | | | |
| 3 | | | | | | reserved | | | | | | |

In an embodiment, uplink power is boosted for more than 4 PUSCH layers.

In an embodiment, DMRS-PTRS association for UL is defined according to the following table:

| Value | DMRS port |
|---|---|
| 0 | 0 |
| 1 | 1 |
| 2 | 2 |
| 3 | 3 |
| 4 | 4 |
| 5 | 5 |
| 6 | 6 |
| 7 | 7 |

In an embodiment, DMRS antenna ports configuration in DCI and DMRS and PTRS QCL configurations in TCI are expanded to allow simultaneous configuration of TD-OCC DMRS and PTRS.

According to a third aspect of the present invention, there is provided a User Equipment, UE, operable to perform the method of the second aspect.

According to a fourth aspect of the present invention, there is provided a telecommunication system comprising a base station and the UE of the third aspect.

Although a few preferred embodiments of the present invention have been shown and described, it will be appreciated by those skilled in the art that various changes and modifications might be made without departing from the scope of the invention, as defined in the appended claims.

The present disclosure provides improvements in Location based Services (LBS) used in mobile telecommunication networks to provide location information of a particular user Equipment.

BRIEF DESCRIPTION OF THE DRAWINGS

For a better understanding of the invention, and to show how embodiments of the same may be carried into effect, reference will now be made, by way of example only, to the accompanying diagrammatic drawings in which:

FIG. 16 shows a table illustrating time density of PTRS as a function of scheduled MCS (table 5.1.6.3-1 from TS38.214);

FIG. 17 shows a table illustrating the operation of the parameter $k^{RE}_{res}$ (derived from Table6.4.1.2.2.1-1 in TS38.211);

FIG. 18 shows an extended table illustrating the operation of the parameter $K^{RE}_{ref}$ according to an embodiment of the present invention;

FIGS. 19 to 22 show alternative configurations for PDSCH layers (derived from Table 4.1-2 in TS38.214);

FIG. 23 shows a power boosting table in the Uplink (derived from Table 6.2.3.1-3); and FIG. 24 shows a DMRS-PTRS association table.

DETAILED DESCRIPTION

Embodiments of this invention aim to provide methods and apparatus associated with PRS Configuration in New Radio (NR) in particular, but which may be applicable to other systems.

Figure 1:
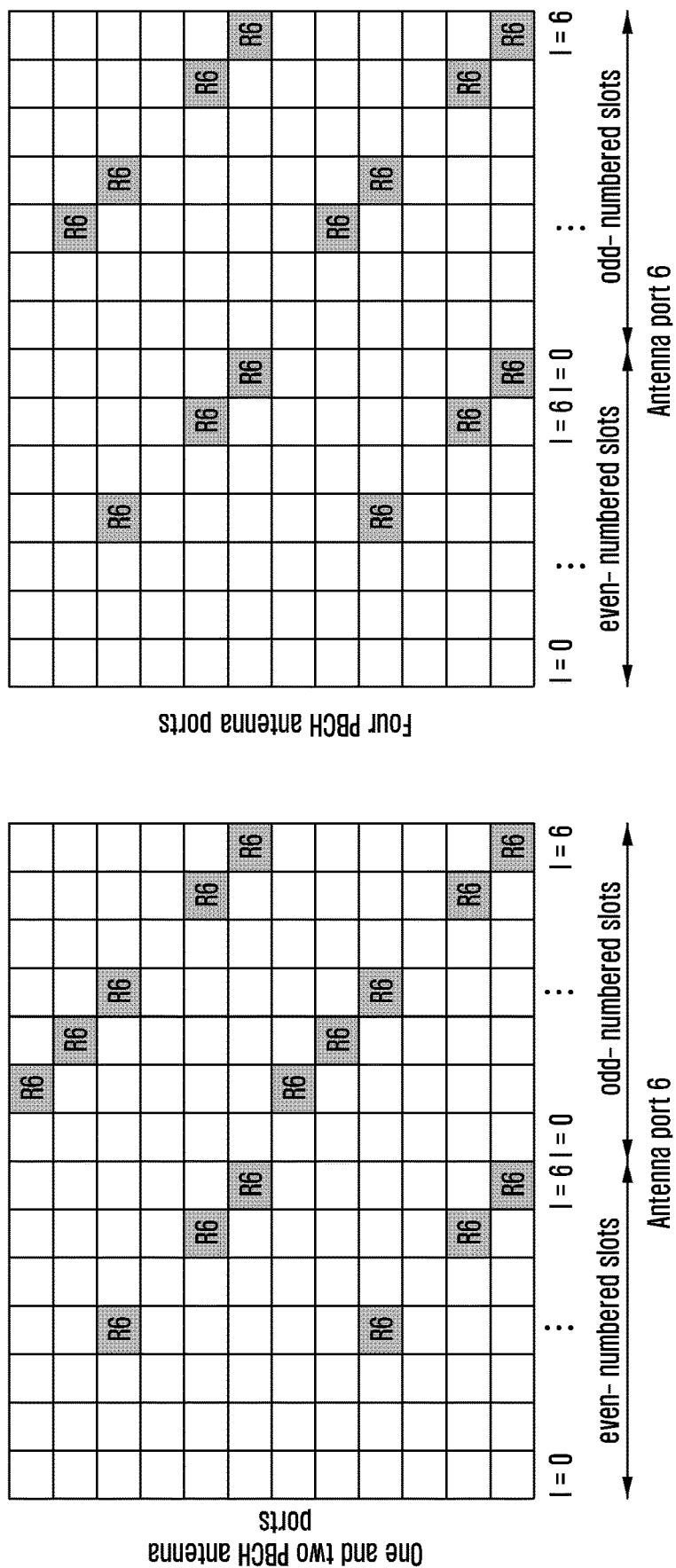
FIG. 1 shows mapping of positioning reference signals (normal cyclic prefix) according to the prior art.
Figure 2:
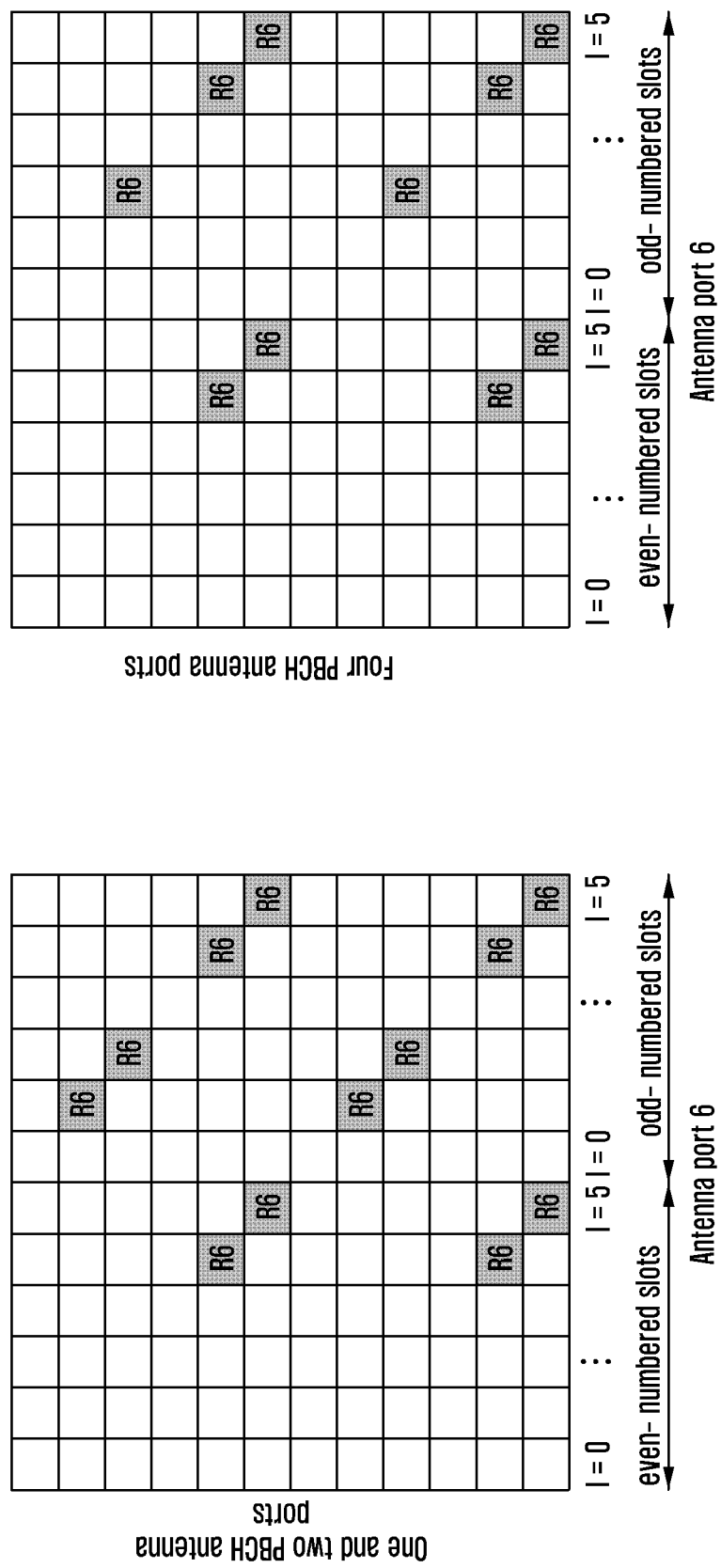
FIG. 2 shows mapping of positioning reference signals (extended cyclic prefix) according to the prior art.

PRS is cell specific in LTE (i.e. the prior art) and its pattern is shown in FIG. 1 (normal cyclic prefix) and FIG. 2 (extended cyclic prefix) (both derived from TS 36.211).

The reasons for such patterns are as follows:
1) PRS is configured on subframe basis;
2) No PRS in the first N symbols to avoid collision with PDCCH, which occupies the whole bandwidth;
3) PRS should not collide with CRS in symbol;
4) Distance between two PRS subcarriers is 6 so that the UE can receive maximum 6 simultaneous PRS from 6 different cells with different offset values, e.g., 1-5. The orthogonality of the PRS from different cells reduces the interference so that the arrival time difference estimation is more accurate;
5) The diagonal pattern of PRS allows the configuration to benefit from frequency diversity.

Figure 3:
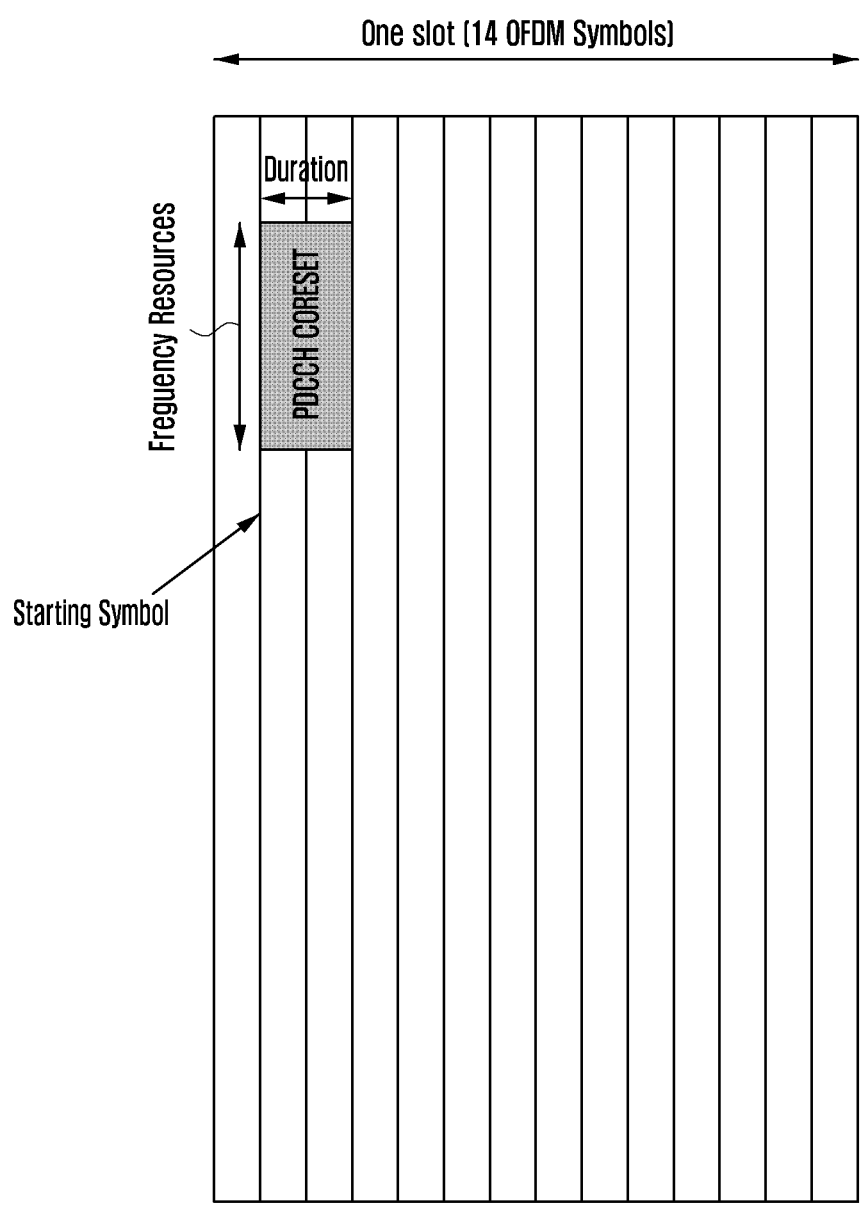
FIG. 3 shows CORESET positioning according to the prior art.

For NR, according to embodiments of the invention, the configuration can also be cell-specifically defined so that the same configuration, e.g., bandwidth (BW), periodicity, duration, etc., is applied to all UEs within one cell. However there are a few significant differences as follows:
1) One slot can contain 14 symbols, similar to a subframe in LTE and the mini slot (7, 4 or 2 OFDM symbols) is introduced with less than 14 symbols;
2) There is no CRS in NR;
3) PDCCH no longer occupies the whole bandwidth but only some of the resource elements (REs) within one or multiple Control Resource Sets (CORESET), which only occupy partial bandwidth as shown in FIG. 3.

Figure 4:
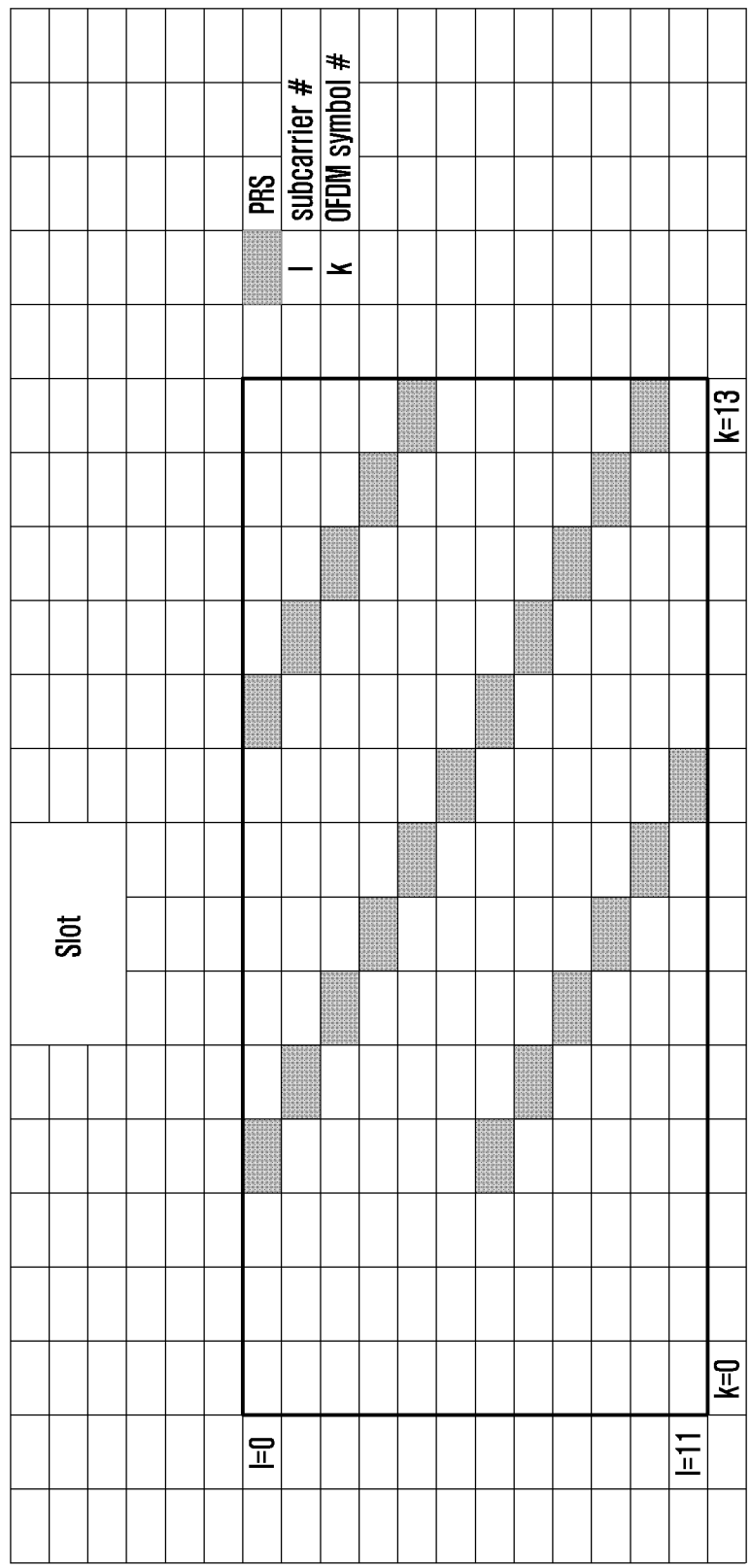
FIG. 4 shows PRS configuration on slot/mini slot basis according to an embodiment of the invention.
Figure 5:
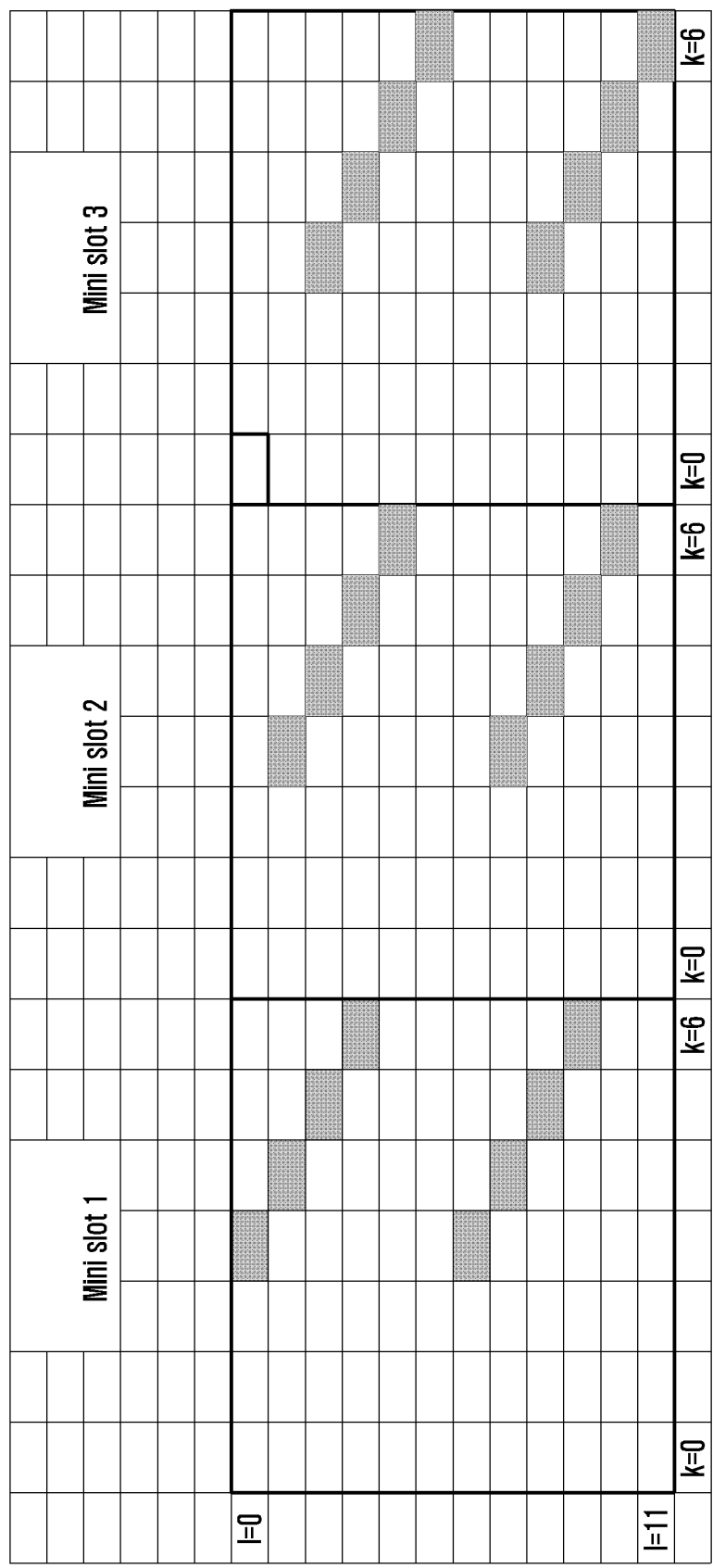
FIG. 5 shows PRS configuration on aggregated slot/mini slot basis according to an embodiment of the invention.
Figure 6:
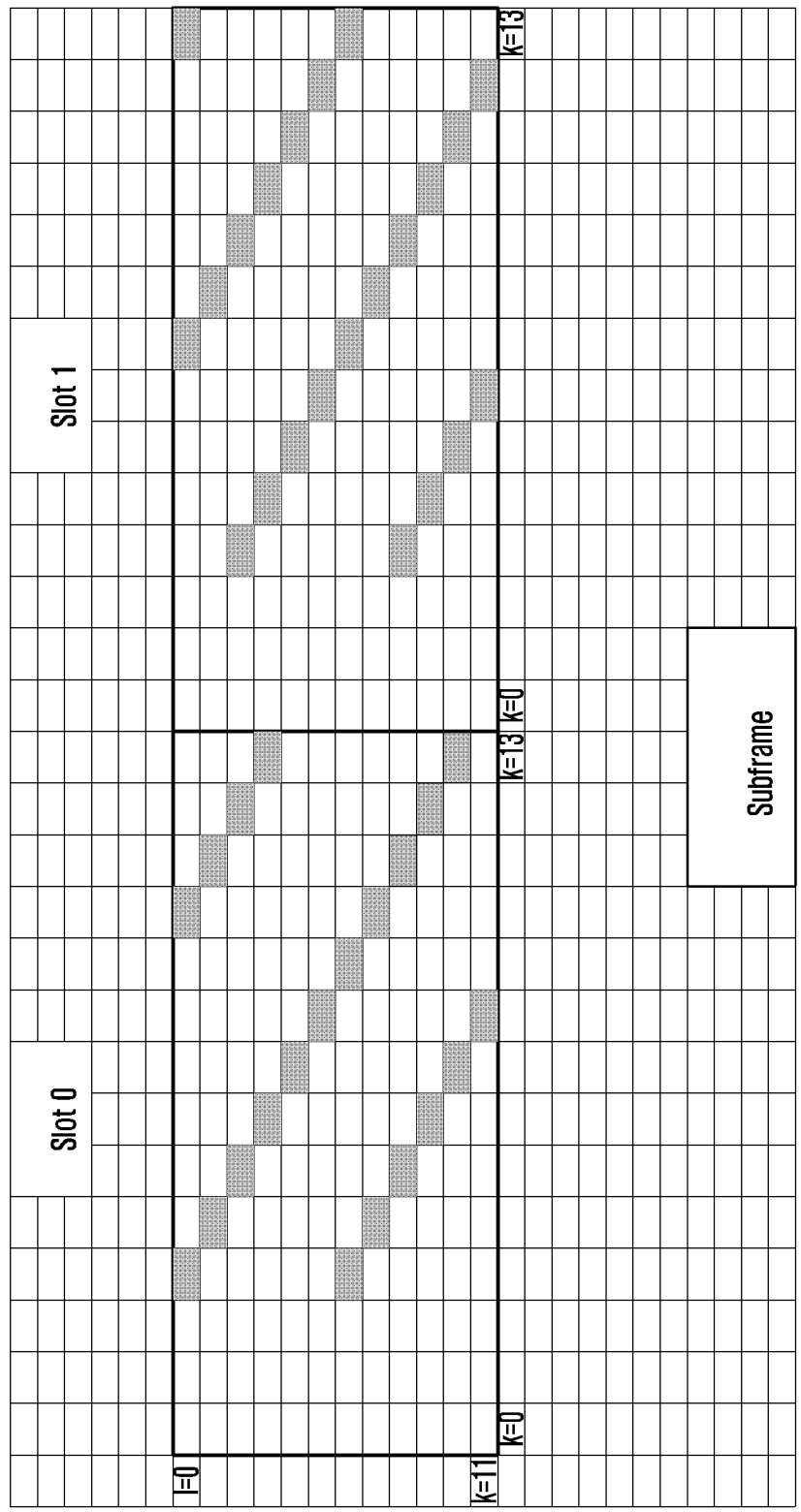
FIG. 6 shows PRS configuration on subframe basis according to an embodiment of the invention.

For features 1) and 2) above, PRS can be configured in one of the following alternatives:
1: PRS is configured on slot/mini slot basis, i.e., PRS pattern is repeated on slot/mini slot basis as shown in FIG. 4;
2: Slots/mini slots can be aggregated and the PRS configuration is applied on aggregated slots/mini slots basis as shown in FIG. 5, which shows an aggregation level of 3;
3: PRS is configured on a subframe basis and one subframe can consists of $N_{slot}$ slots/mini slots as shown in FIG. 6.

Figure 7:
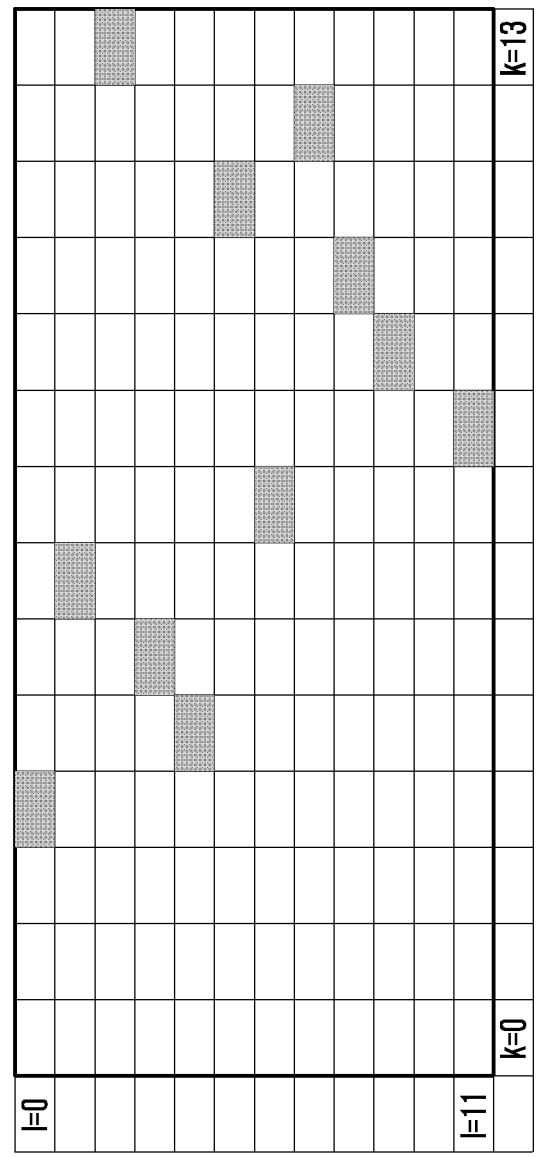
FIG. 7 PRS configuration on slot/mini slot basis with randomized subcarrier according to an embodiment of the invention.

The PRS subcarrier number for each symbol can be chosen as one of the following alternatives:
For symbol N+1, the subcarrier number is offset from symbol N by a constant $l_{offset}$ value as shown in FIG. 4-6 ($l_{offset}=1$). One special case is where offset value $l_{offset}$ is 0, so that the same subcarrier is chosen for PRS;
For symbol N+1, the subcarrier number is offset from symbol N by a variable $l_{offset}$ value and this value can either be pre-defined, or upper layer configured, e.g., RRC/LPP configured, or generated based on a certain pseudo-random sequence, e.g., Gold code, in a cell-specific manner, e.g., based on Physical cell ID (PCI);
The subcarrier number for each symbol is either based on predefined values, or upper layer configured, e.g., RRC/LPP configured, or on certain pseudo-random sequence, e.g., Gold code, and generated in a cell-specific manner, e.g., based on Physical cell ID (PCI) as shown in FIG. 7.

As can be seen from above figures, there is no CRS present (unlike in LTE) so that PRS can be configured for every symbol.

Figure 8A:
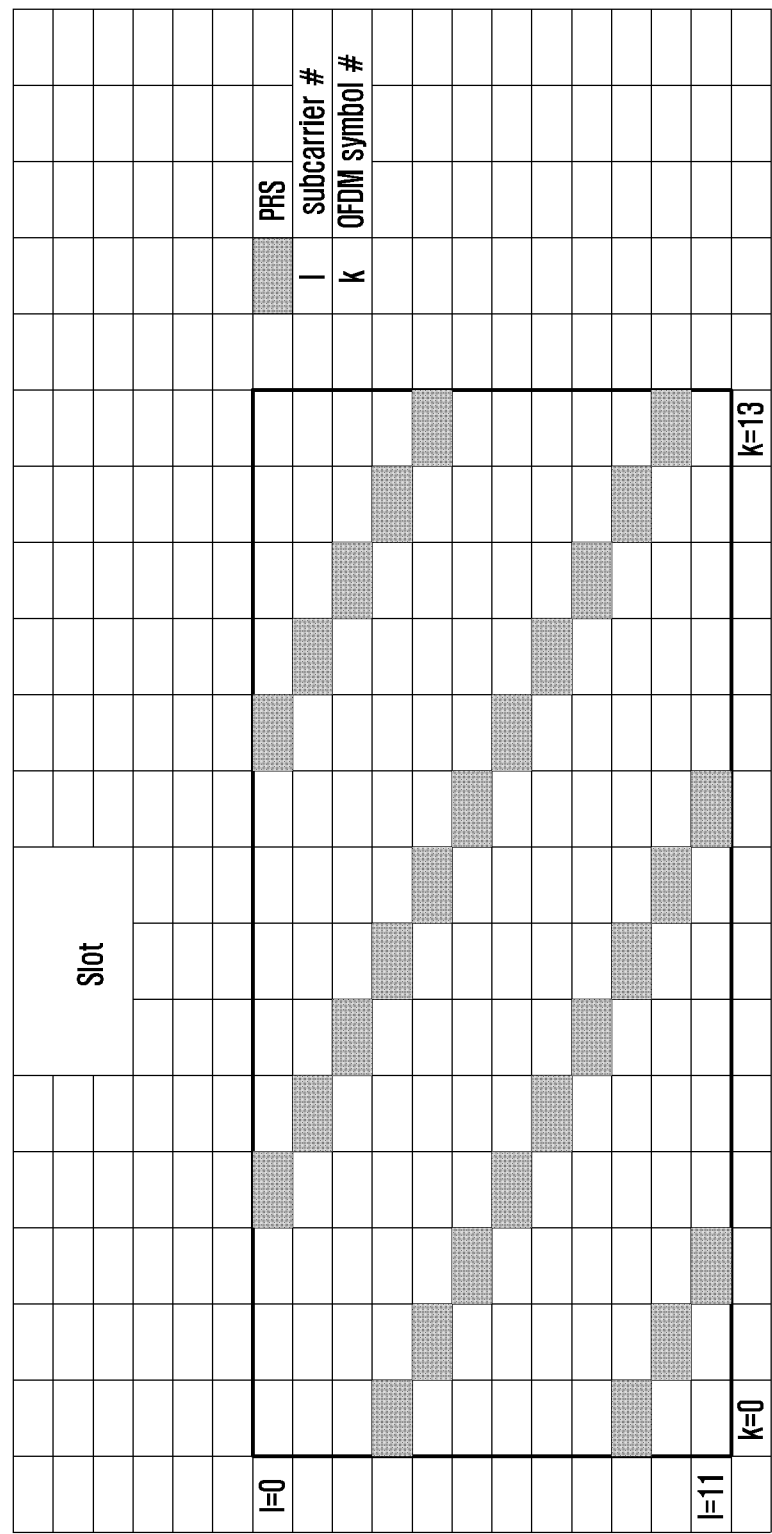
FIG. 8a shows PRS configuration without PDCCH transmission according to an embodiment of the invention.
Figure 8B:
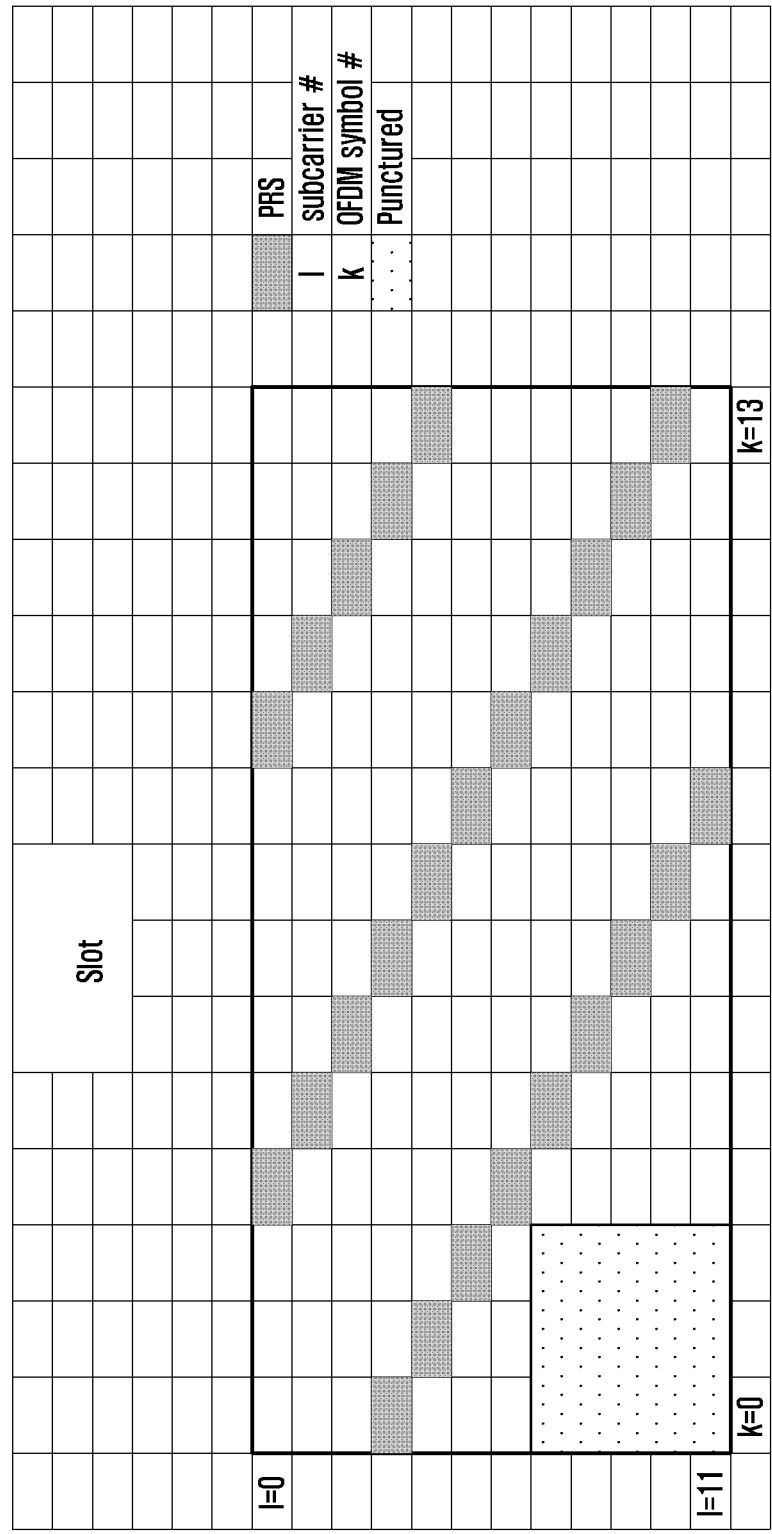
FIG. 8b shows PRS configuration considering CORESET according to an embodiment of the invention.
Figure 9:
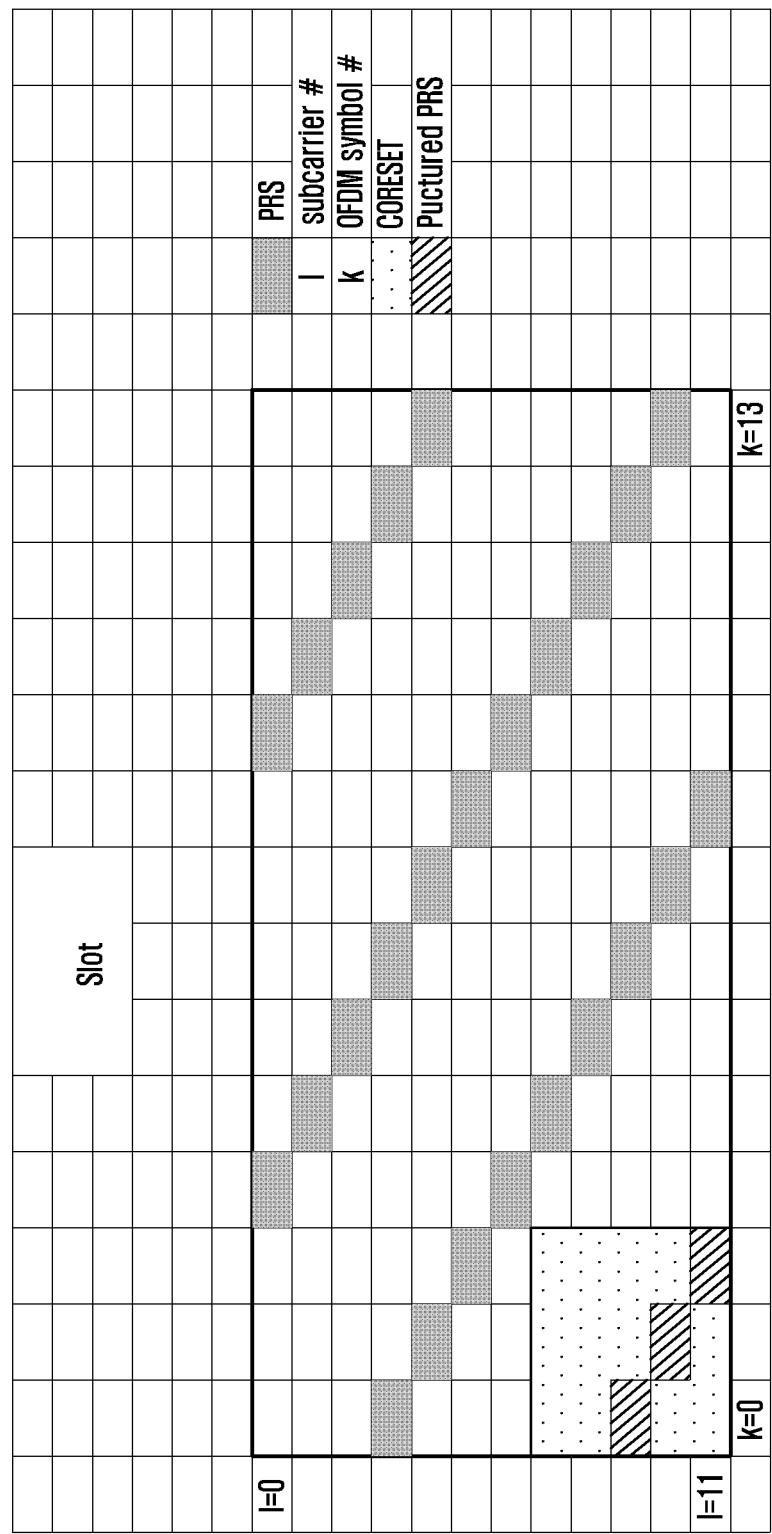
FIG. 9 shows PRS configuration with CORESET (PRS punctured) according to an embodiment of the invention.
Figure 10:
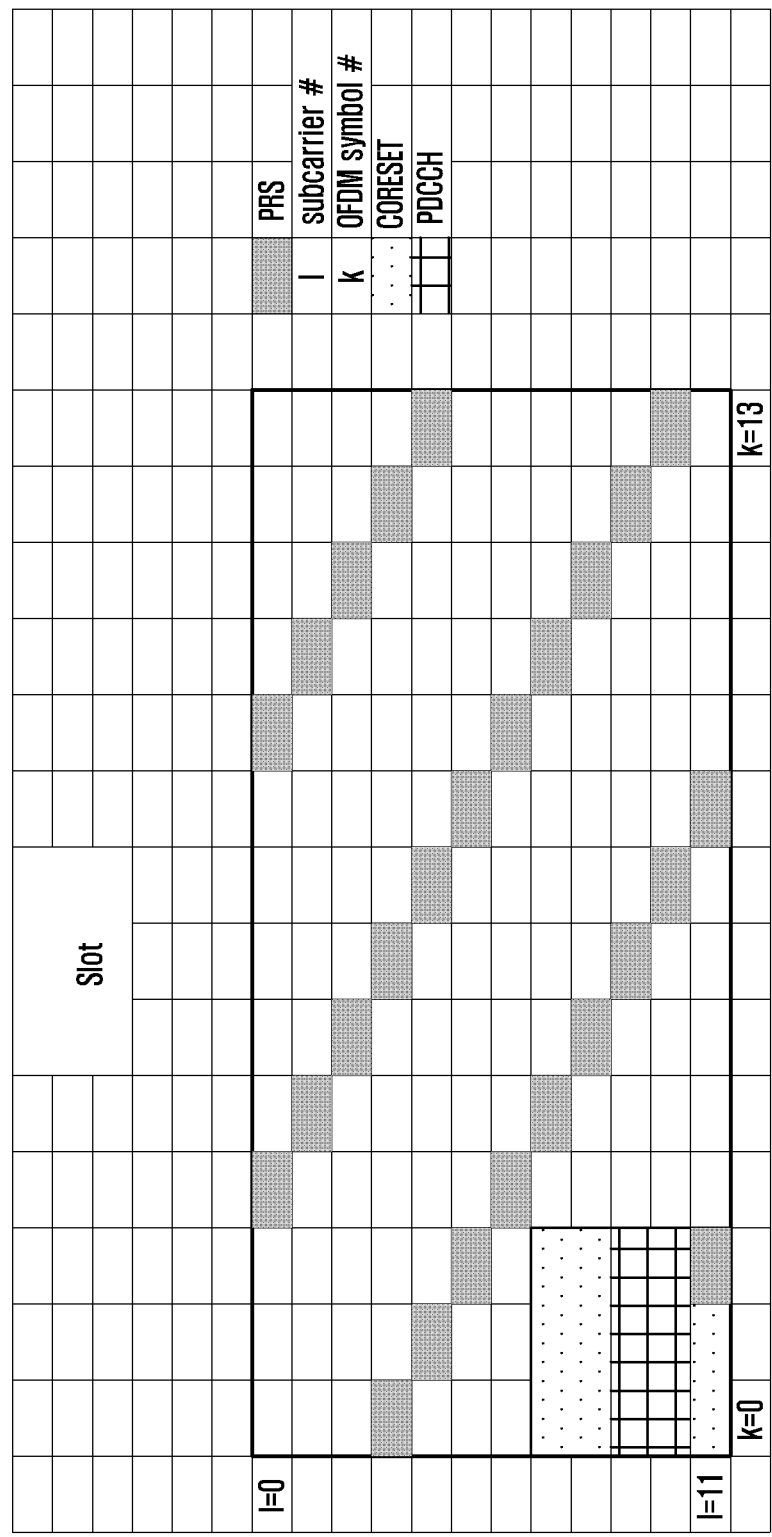
FIG. 10 shows PRS configuration with CORESET and PDCCH according to an embodiment of the invention.

In order to avoid collision with CORESET/PDCCH, the following alternatives can be considered:
1: No PRS for the first N symbols that may be occupied by CORESET even though the CORESET may not occupy the whole bandwidth. Note that N is either fixed to equal the maximum number of symbols occupied by CORESET or it can be implicitly derived from RRC configuration by the UE and, thus, variable;
2: PRS is configured within the partial bandwidth not occupied by CORESET, i.e., PRS will be configured in the REs of PDSCH as shown in FIG. 8b;
3: PRS is configured within the entire slot but will be punctured when colliding with CORESET as shown in FIG. 9;
4: Within a CORESET, there may be some REs available to PDSCH, e.g., REs not assigned to PDCCH, and the PRS can be configured in these REs as shown in FIG. 10. PRS can then either be configured around PDCCH as in FIG. 8b or punctured when colliding with PDCCH as in FIG. 10;
If no PDCCH is transmitted, the PRS can start from the first symbol, as shown in FIG. 8a.

It should be noted that for alternatives 2, 3 and 4, above, there might be a need for the positioning protocol, e.g., LPP, to know the configuration of CORESET, which can configured by upper layers, e.g., RRC, or lower layers, e.g., DCI. In this regard, the CORESET configuration information should be conveyed to and known by the positioning protocols, e.g., LPP or positioning units or Location Measurement Unit (LMU).

The information relevant to CORESET configuration is in the PDCCH-Config IE as defined in TS 38.331. As such, the location of CORESET should be known by positioning protocols. It should be noted that the information exchange may happen between the UE and the cell, e.g., gNB or TRP, or within the cell but between two protocols, e.g., between RRC and LPP.

It should also be noted that there might be some REs not available to PDSCH, as defined in TS 38.211-214, and such REs can be treated in the same way as CORESET, as set out above.

PRS configuration within one resource block (RB) is discussed in the previous sections. In the following PRS RB mapping in the frequency domain will be described. $N_{PRS}$ RBs can be configured for PRS and $N_{PRS}$ is configured by upper layers.

Figure 11:
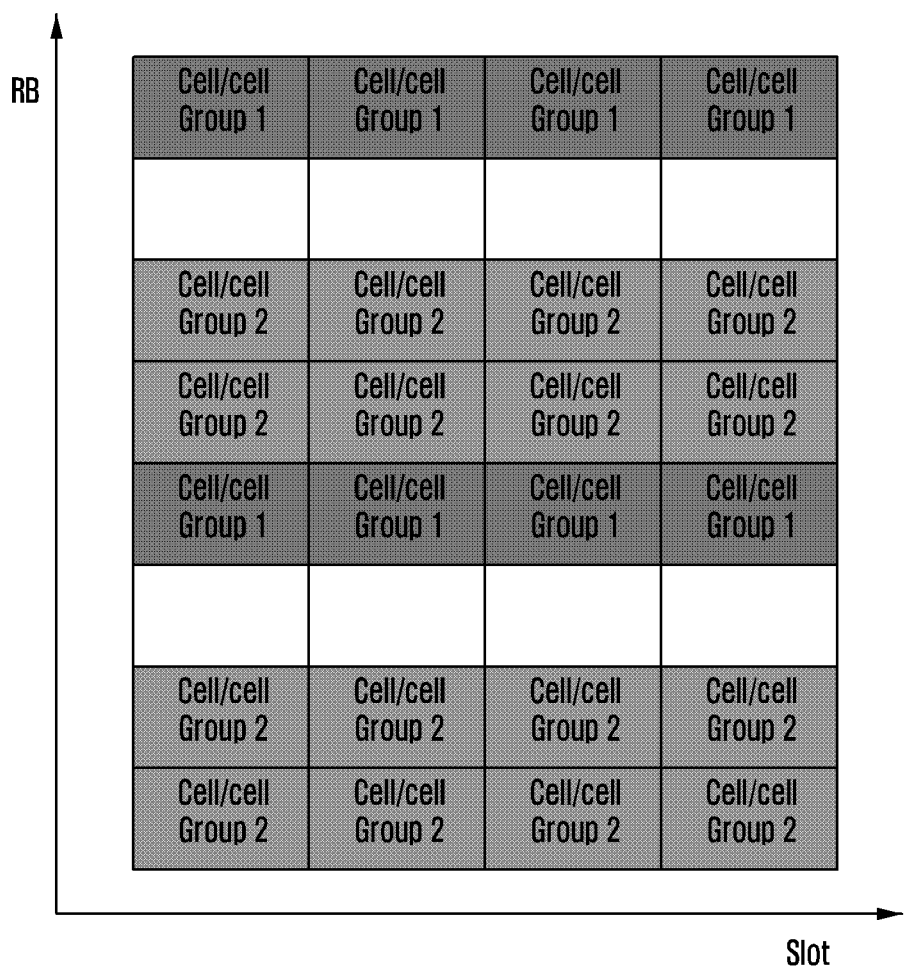
FIG. 11 shows PRS configuration in frequency domain with interleaving for multiple cell/cell groups according to an embodiment of the invention.

There are alternative configurations which can be considered:
1: Consecutive RBs are configured with PRS by one cell/cell group;
2: RBs with PRS from multiple cells/cell groups are discontinuous and interleaved either based on pre-defined pattern or a pseudo-randomly generated pattern as shown in FIG. 11.

Option 2 above can benefit from frequency diversity but requires more configuration parameters to be configured by upper layers, e.g., size of each RB sub-group, interleave pattern, etc.

As mentioned above, for cell-specific PRS configuration, the same configuration is applied to all UEs within one cell regardless of whether the UE needs to do positioning or not, which will cause significant overhead. In order to reduce the overhead, PRS configuration can be UE specific, e.g., based on UE specific parameters such as Radio Network Temporary Identifier (RNTI).

Figure 12:
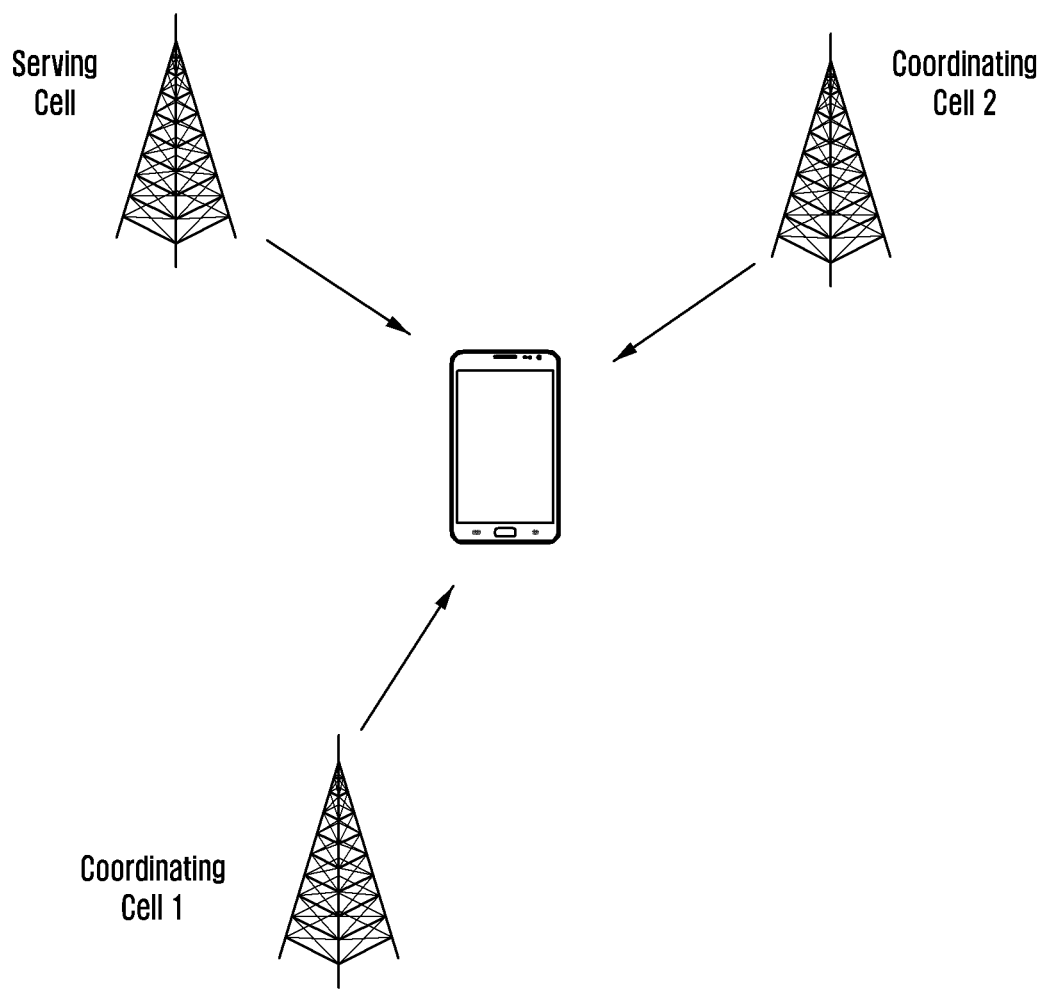
FIG. 12 shows PRS from multiple cells including one serving cell and multiple coordinating cells according to an embodiment of the invention.

The UE needs to receive PRS from multiple cells as shown in FIG. 12 to measure the difference in arrival times. In this regard, the UE PRS configuration should be coordinated for all cells via the X2 interface.

Figure 13:
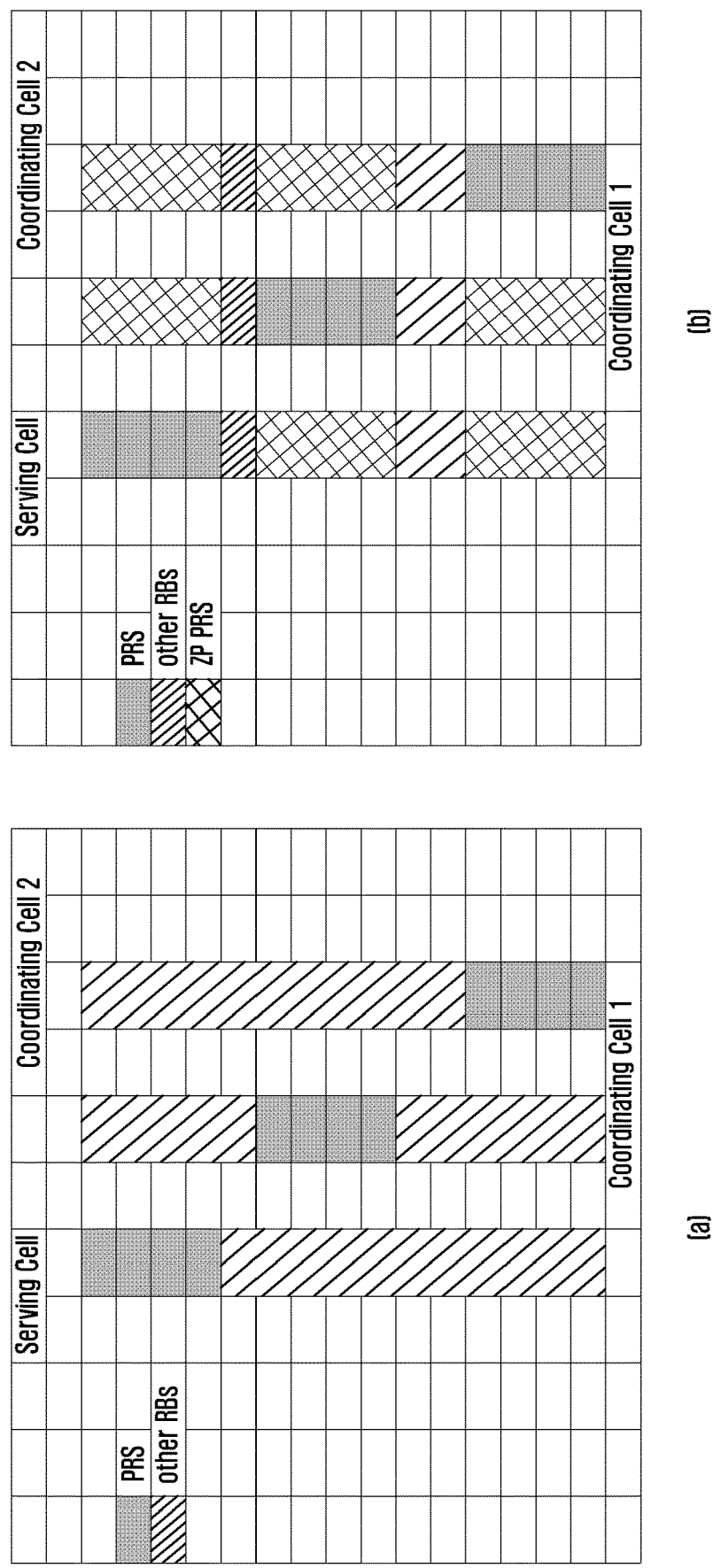
FIG. 13 shows co-ordinated PRS RB allocation according to an embodiment of the invention.

There are a few options for coordinated resource allocation as follows.
1: Each cell allocates resources for PRS independently based on measurement results such as Reference Signal Received Power (RSRP), Reference Signal Received Quality (RSRQ), etc. Each cell always allocates the resources with the strongest signal strength to the UE. There are two sub-options:
a: RBs for PRS of cell i can overlap with data or PRS RBs from other cells as shown in FIG. 13 (*a*);
b: RBs for PRS of cell i are blanked by other cells to reduce interference. This can be achieved by configuring zero power (ZP) PRS as shown in FIG. 13 (*b*).

Figure 14:
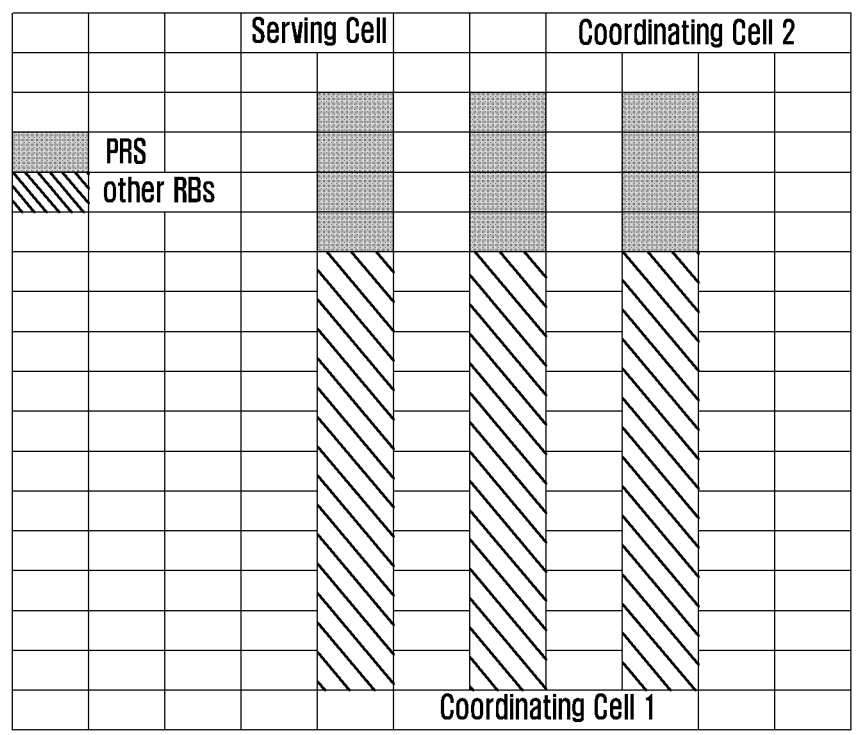
FIG. 14 shows co-ordinated PRS RB allocation according to an embodiment of the invention.

2: Common resources are allocated for PRS for all cells as shown in FIG. 14. There are two sub-options:
a: Resources with stronger signal strength in the serving cell are allocated;
b: Resources with stronger signal strength in the coordinating cell are allocated to improve the hearability.

The PRS pattern described previously for cell-specific PRS can also be used for UE specific cases. It should also be noted that all the various alternatives described herein can be combined as required to provide more flexibility.

In addition to the features described above, there are related issues addressed by embodiments of this invention.

Cyclic Prefix (CP)

As mentioned, the UE needs to measure PRS from coordinating cells and these coordinating cells could be quite far away from the UE. In this regard, a longer cyclic prefix (CP) is needed. In the current NR specifications, extended CP can only be used for 60 kHz, which might not be suitable for macro cells where 15 kHz is normally used. Therefore, extended CP may be required for at least 15 kHz and 30 kHz for PRS.

DC Tone

In LTE, PRS RBs are configured around DC tone. In embodiments for NR, three options can be considered.
1: PRS RBs are allocated around DC tone, which is decided by Component Carrier (CC) center;
2: PRS RBs are allocated around DC tone decided per bandwidth part (BWP);
3: PRS RBs are allocated in pre-defined manner without knowing the DC tone information.

Option 1 can be easily applied to cell-specific PRS.

Option 2 can be used for either cell-specific PRS or UE-specific PRS, where the DC tone can be decided by UE on per BWP basis. In this case, UE needs to report the position of DC tone to the base station (BS) and the report should be per BWP basis. Such information needs to be conveyed to and known by the positioning protocols, e.g., LPP or positioning units, e.g., LMU.

If DC tone information is not known, option 3 can be used.

PRS Antenna Port

Figure 15:
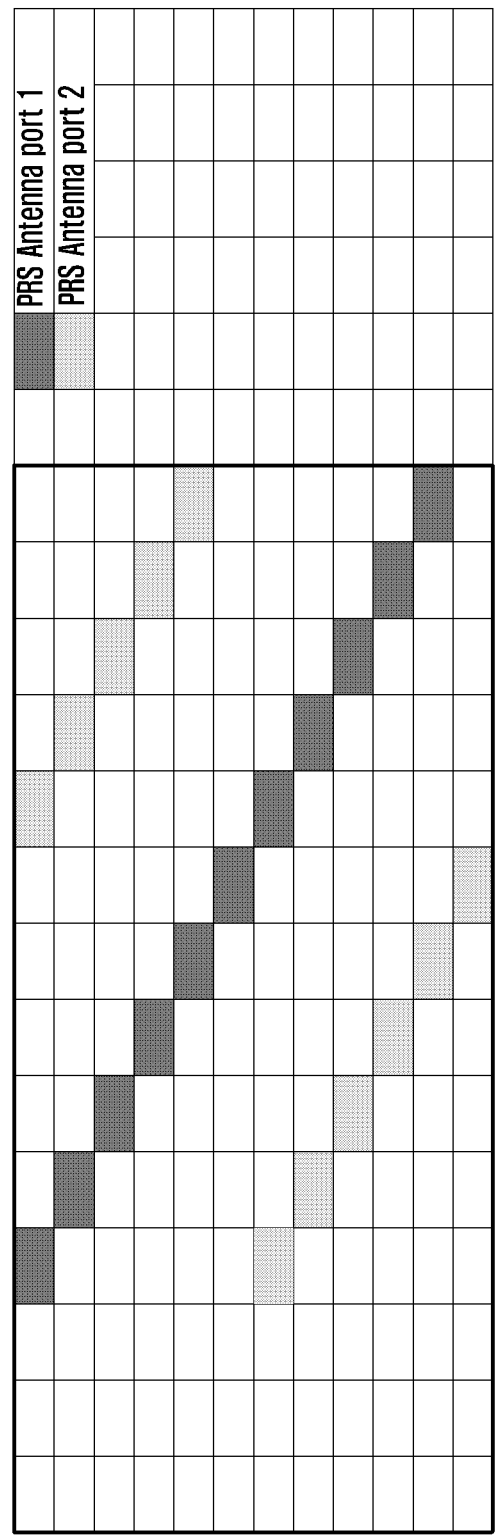
FIG. 15 shows configuration of PRS with multiple antenna ports according to an embodiment of the invention.

In LTE, PRS is transmitted in antenna port 6. However, in NR, when considering multi-panel operation, especially for above 6 GHz, i.e., Frequency Band 2 (FR2), one antenna port might not be feasible. There are therefore three alternatives that need to be considered:
1: For both below 6 GHz, i.e., FR1 and above 6 GHz, i.e., FR2, only one antenna port is supported;
2: For FR1, one antenna port is supported but for FR2, more than one antenna port are supported as shown in FIG. 15;
3: For both below 6 GHz, i.e., FR1 and above 6 GHz, i.e., FR2, more than one antenna port is supported.

For FR1, the transmission could be omni-directional and therefore one antenna port is enough. In addition, there is no need to split the power between multiple antenna ports so that the positioning accuracy is good. For FR2 with beamforming, there might be a need to use multiple beams so that the UE can be covered by one of the beams. In this regard, multiple antenna ports are needed. The number of antenna ports is configured by upper layers and beam related information is conveyed to, and known by, the positioning protocols, e.g., LPP or positioning units, e.g., LMU.

PT-RS time density can be every symbol, every other symbol or every 4 symbols, depending on RRC configuration and/or implicitly derived from Modulation Coding Scheme (MCS) level based on the table shown in FIG. 16, which shows four possible PTRS densities depending on scheduled MCS as shown.

When phase rotation between two consecutive OFDM symbols is so large that phase compensation has to be performed, a PT-RS time density of 1 is configured and it is reasonable that TD-OCC DMRS is not configured in such circumstances. However, for lower MCS levels, the PT-RS time density is only 2 or 4, which means the phase rotation between two consecutive OFDM symbols is not significant and TD-OCC DMRS may be allowed in such cases. However, according to the prior art, this is forbidden. Embodiments of the present invention provide multiple alternatives as follows.

In a first embodiment, a UE receiving PDSCH is configured with the higher layer parameter PTRS-DownlinkConfig and the PT-RS time density is 1 (the scheduled MCS from FIG. 16 is smaller than ptrs-MCS4 but larger or equal to ptrs-MCS3), and the UE may assume that the following configurations are not occurring simultaneously for the received PDSCH:
any DM-RS ports among 1004-1007 or 1006-1011 for DM-RS configurations type 1 and type 2, respectively are scheduled for the UE and the other UE(s) sharing the DM-RS REs on the same CDM group(s); and
PT-RS is transmitted to the UE.

Or alternatively, a UE receiving PDSCH is configured with the higher layer parameter PTRS-DownlinkConfig (the scheduled MCS from FIG. 16 is smaller than ptrs-MCS4 but larger or equal to ptrs-MCS3), and the UE may assume that the following configurations are not occurring simultaneously for the received PDSCH:
any DM-RS ports among 1004-1007 or 1006-1011 for DM-RS configurations type 1 and type 2, respectively are scheduled for the UE and the other UE(s) sharing the DM-RS REs on the same CDM group(s); and
PT-RS is transmitted to the UE with time density 1.

If only TD-OCC DMRS with PT-RS time density 4 is permitted, this embodiment operates as follows.

In the same first embodiment, If a UE receiving PDSCH is configured with the higher layer parameter PTRS-DownlinkConfig and the PT-RS time density is 1 or 2 (the scheduled MCS from FIG. 16 is smaller than ptrs-MCS4 but larger or equal to ptrs-MCS2), the UE may assume that the following configurations are not occurring simultaneously for the received PDSCH:
any DM-RS ports among 1004-1007 or 1006-1011 for DM-RS configurations type 1 and type 2, respectively are scheduled for the UE and the other UE(s) sharing the DM-RS REs on the same CDM group(s); and
PT-RS is transmitted to the UE.

Or alternatively, a UE receiving PDSCH is configured with the higher layer parameter PTRS-DownlinkConfig (the scheduled MCS from FIG. 16 is smaller than ptrs-MCS4 but larger or equal to ptrs-MCS3), and the UE may assume that the following configurations are not occurring simultaneously for the received PDSCH:
any DM-RS ports among 1004-1007 or 1006-1011 for DM-RS configurations type 1 and type 2, respectively are scheduled for the UE and the other UE(s) sharing the DM-RS REs on the same CDM group(s); and PT-RS is transmitted to the UE with time density 1 or 2.

When this new configuration of TD-OCC DMRS and PT-RS, which is permitted according to this embodiment of the invention, various aspects of PT-RS configuration will be affected including RE offset, RB offsets and power boosting. The details will be described later.

In a second embodiment, due to UE capability, some UEs which operate in a communication system might be able to configure TD-OCC DMRS and PTRS simultaneously to support up to 8 and 12 layer transmission for DMRS type 1 and 2, respectively, but some UEs might not have this capability. Whether they do or not depends upon their physical capabilities.

In this embodiment, explicit signalling is used to indicate that simultaneous configuration of TD-OCC DMRS and PTRS with time density larger than 1 is permitted. The signalling can either be higher layer signalling, e.g., RRC or MAC-CE, in semi-persistent manner or DCI in dynamic manner.

In this way, not all UEs are required to support simultaneous configuration of TD-OCC and PTRS. In addition, in a UE capability report, sent from the UE to the network, the UE may report whether or not it can support simultaneous configuration of TD-OCC DMRS and PTRS.

Alternatively, instead of reporting capability to support simultaneous configuration of TD-OCC DMRS and PTRS, this may be done implicitly. For instance, the UE reports a maximum number of transmission layers it can support and if this number is smaller than or equal to 4 in DMRS type 1 or 6 in DMRS type 2, then there is no simultaneous configuration of TD-OCC DMRS and PTRS; otherwise, simultaneous configuration of TD-OCC DMRS and PTRS is permitted.

In standardisation discussions, It has been agreed to introduce an RRC parameter "PTRS-RE-offset" consisting of 2 bits for indication of a PTRS subcarrier within the subset of subcarriers used by the associated DMRS port. This is shown in FIG. 17.

However, in the table of FIG. 17 only DMRS port 1-3 and 0-5 are considered for DMRS type 1 and 2, respectively, because DMRS port 4-7 and 6-11 for DMRS type 1 and 2 are provided for the case of TD-OCC configuration. If TD-OCC DMRS and PT-RS can be configured at the same time, as per embodiments of the present invention, this table should be extended to include port 4-7 and 6-11 for DMRS type 1 and 2, respectively, as shown in the table in FIG. 18. If the higher-layer parameter resourceElementOffset in PTRS-UplinkConfig is not configured, the column corresponding to '00' shall be used by default.

PT-RS can be power boosted based on the tables shown in FIGS. 19 to 22. FIG. 19 shows the prior art situation, and FIGS. 20 to 22 shows the situation according to one or more embodiments of the invention.

In the prior art (as shown in FIG. 19), the number of PDSCH layers is limited to 6, which is half of the total number of DMRS ports for type 2 because if PT-RS is configured, without TD-OCC, the number of DMRS ports which can be configured is up to 4 and 6 for DMRS type 1 and 2, respectively. However, if the restriction is removed, as per embodiments of the present invention, the total number of PDSCH layers can be up to 8 and 12 for type 1 and 2, respectively and the table of FIG. 19 can be extended to allow for more PDSCH layers as shown in FIG. 20.

If there is a power limit, the maximum epre-ratio is capped at a certain level and all the values in the table that are larger than that certain level should be set to be equal to the power limit. epre indicates power for one resource element (RE) and EPRE ratio is the ratio between PT-RS REs and other REs, e.g., data REs.

For example, if the power limit is 6 dB, the table should be changed to the one shown in FIG. 21, where the values from FIG. 20 which exceed 6 dB are capped at 6 dB to meet the power limit.

Alternatively, the table of FIG. 22 can be configured, where an extra row may be added to represent the case where a power limit applies. Then, the power limit may be captured by selecting the appropriate row (epre-ratio=2).

In the case of Uplink (UL), the power boosting table is as shown in FIG. 23, shows power boosting ratio for UL transmission for both codebook based and non-codebook based transmissions depending on the number of transmission layers of PUSCH.

Similarly, the number of PUSCH layers is limited to 4 due to UE complexity as well as the aforementioned TD-OCC restriction. If the TD-OCC restriction is lifted, as per embodiments of the invention, the power boosting table can be extended for the UL the same as the DL power boosting tables described above, and a power limit can be imposed as in FIG. 21, 21 or 22 which deal with DL power boosting.

Other matters arising with embodiments of the invention are as follows.

Figure 24:
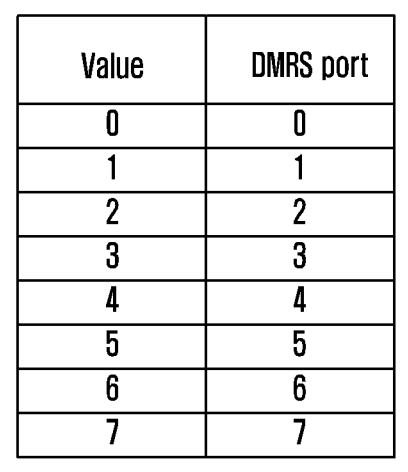

DMRS-PTRS association for UL may be amended. In the prior art, the number of DMRS ports is limited to 4 in UL. If UE complexity is increased in the future and the TD-OCC restriction is removed, it may be possible to extend this to more than 4 layers and thus the current association tables may be extended accordingly. For example, table 7.3.1.1.2-25 in TS38.212 can be extended as shown in FIG. 24, with the proviso that more than 2 bits are needed to code for this.

If configuration of simultaneous TD-OCC DMRS and PT-RS is allowed, as per embodiments of the invention, the number of possible DMRS configurations is increased and the Antenna port(s) field in DCI signalling may be expanded.

If configuration of simultaneous TD-OCC DMRS and PT-RS is allowed, as per embodiments of the invention, the number of possible DMRS and PTRS QCL configurations is increased and the TCI field may be expanded to allow for such cases.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A method performed by a user equipment (UE) in a communication system, the method comprising:
   identifying information associated with a positioning reference signal (PRS) based on a configuration;
   identifying parameters for the PRS based on the information; and
   receiving, from a base station, the PRS based on the parameters,
   wherein the parameters for the PRS comprises:
      a first symbol of the PRS within a slot;
      a size of a PRS resource in a time domain;
      a distance between two PRS subcarriers in a PRS symbol; and
      a subcarrier offset for the PRS symbol.

2. The method of claim 1, wherein the parameters further comprise a number of resource blocks configured for the PRS.

3. The method of claim 1, wherein the subcarrier offset for the PRS symbol is defined based on a previous PRS symbol.

4. The method of claim 1, wherein the distance between two PRS subcarriers in the PRS symbol is one of values comprising at least 2 and 4.

5. The method of claim 1, wherein the configuration is associated with a long-term evolution (LTE) positioning protocol (LPP) message of a location management function, and
   wherein a radio resource control (RRC) protocol provides transport for the LPP message.

6. A method performed by a base station in a communication system, the method comprising:
   identifying parameters for a positioning reference signal (PRS);
   transmitting, to a user equipment (UE), a configuration for information associated with the PRS; and
   transmitting, to the UE, the PRS based on the parameters,
   wherein the parameters for the PRS comprises:
      a first symbol of the PRS within a slot;
      a size of a PRS resource in a time domain;
      a distance between two PRS subcarriers in a PRS symbol; and
      a subcarrier offset for the PRS symbol.

7. The method of claim 6, wherein the parameters further comprise a number of resource blocks configured for the PRS.

8. The method of claim 6, wherein the subcarrier offset for the PRS symbol is defined based on a previous PRS symbol.

9. The method of claim 6, wherein the distance between two PRS subcarriers in the PRS symbol is one of values comprising at least 2 and 4.

10. The method of claim 6, wherein the configuration is associated with a long-term evolution (LTE) positioning protocol (LPP) message of a location management function, and
    wherein a radio resource control (RRC) protocol provides transport for the LPP message.

11. A user equipment (UE) in a communication system, the UE comprising:
    a transceiver; and
    at least one processor configured to:
       identify information associated with a positioning reference signal (PRS) based on a configuration;
       identify parameters for the PRS based on the information; and
       receive, from a base station, the PRS based on the parameters,
    wherein the parameters for the PRS comprises:
       a first symbol of the PRS within a slot;
       a size of a PRS resource in a time domain;
       a distance between two PRS subcarriers in a PRS symbol; and
       a subcarrier offset for the PRS symbol.

12. The UE of claim 11, wherein the parameters further comprise a number of resource blocks configured for the PRS.

13. The UE of claim 11, wherein the subcarrier offset for the PRS symbol is defined based on a previous PRS symbol.

14. The UE of claim 11, wherein the distance between two PRS subcarriers in the PRS symbol is one of values comprising at least 2 and 4.

15. The UE of claim 11, wherein the configuration is associated with a long-term evolution (LTE) positioning protocol (LPP) message of a location management function, and
    wherein a radio resource control (RRC) protocol provides transport for the LPP message.

16. A base station in a communication system, the base station comprising:
    a transceiver; and
    at least one processor configured to:
       identify parameters for a positioning reference signal (PRS);
       transmit, to a user equipment (UE), a configuration for information associated with the PRS; and
       transmit, to the UE, the PRS based on the parameters,
    wherein the parameters for the PRS comprises:
       a first symbol of the PRS within a slot;
       a size of a PRS resource in a time domain;
       a distance between two PRS subcarriers in a PRS symbol; and
       a subcarrier offset for the PRS symbol.

17. The base station of claim 16, wherein the parameters further comprise a number of resource blocks configured for the PRS.

18. The base station of claim 16, wherein the subcarrier offset for the PRS symbol is defined based on a previous PRS symbol.

19. The base station of claim 16, wherein the distance between two PRS subcarriers in the PRS symbol is one of values comprising at least 2 and 4.

20. The base station of claim 16, wherein the configuration is associated with a long-term evolution (LTE) positioning protocol (LPP) message of a location management function, and wherein a radio resource control (RRC) protocol provides transport for the LPP message.

* * * * *